(12) United States Patent
Phillips

(10) Patent No.: US 7,665,668 B2
(45) Date of Patent: Feb. 23, 2010

(54) CUT HERE TO DESTROY INDICATOR

(75) Inventor: Simon Phillips, York (GB)

(73) Assignee: Mastercard International, Inc., Purchase, NY (US)

( * ) Notice: Subject to any disclaimer, the term of this patent is extended or adjusted under 35 U.S.C. 154(b) by 273 days.

(21) Appl. No.: 11/506,547

(22) Filed: Aug. 18, 2006

(65) Prior Publication Data

US 2008/0041965 A1 Feb. 21, 2008

(51) Int. Cl.
*G06K 19/06* (2006.01)
(52) U.S. Cl. .................. 235/492; 235/380; 235/451; 235/441
(58) Field of Classification Search .......... 235/492, 235/380, 451, 441; 340/572.1, 4
See application file for complete search history.

(56) References Cited

U.S. PATENT DOCUMENTS

| | | | |
|---|---|---|---|
| 5,574,431 A * | 11/1996 | McKeown et al. ....... | 340/572.3 |
| 6,073,856 A * | 6/2000 | Takahashi ............... | 235/492 |
| 7,327,261 B2 * | 2/2008 | Weslake et al. .......... | 340/572.1 |
| 7,598,876 B2 * | 10/2009 | Fidelis et al. ............ | 340/572.8 |
| 2005/0248487 A1 * | 11/2005 | Okado .................. | 343/700 MS |
| 2006/0005050 A1 * | 1/2006 | Basson et al. ............ | 713/194 |
| 2006/0061475 A1 * | 3/2006 | Moskowitz et al. ...... | 340/572.3 |
| 2006/0101190 A1 * | 5/2006 | McLean ................. | 711/100 |
| 2006/0170534 A1 * | 8/2006 | Arneson et al. .......... | 340/10.2 |
| 2007/0159339 A1 * | 7/2007 | Matsuura et al. ........ | 340/572.8 |
| 2008/0036677 A1 * | 2/2008 | Matsushita et al. ....... | 343/866 |

FOREIGN PATENT DOCUMENTS

JP 2006155571 A * 6/2006

* cited by examiner

*Primary Examiner*—Edwyn Labaze
(74) *Attorney, Agent, or Firm*—Buckley, Maschoff & Talwalkar LLC

(57) ABSTRACT

A data card may comprise a chip and a card body having a first face and a second face. The chip may be mounted in the card body between the first face and the second face at least one of the first face and the second face has a cut indicator.

21 Claims, 7 Drawing Sheets

400

| Lining up a cutting device with a cut indicator |
| --- |
| 401 |

| Cutting a data card at the cut indicator |
| --- |
| 402 |

CUT HERE TO DESTROY INDICATOR

BACKGROUND

A data card such as a credit card, debit card or smart card may store information in a variety of ways. Some data cards store information in magnetic stripes and some store information in a chip. When a data card has expired or is no longer needed, a cardholder may destroy the data card to prevent further use of the card. For example, a credit card issuing bank may instruct cardholders to destroy a magnetic stripe credit card when the card is replaced or has expired.

Because a magnetic stripe is visible on the face of a card it is easy for a cardholder to destroy. Newer cards have chips formed inside a body of the card. The chips are not visible to cardholders. It is difficult for cardholders to properly destroy such cards so that they are rendered unusable.

DETAILED DESCRIPTION

The several embodiments described herein are solely for the purpose of illustration. Embodiments may include any currently or hereafter-known versions of the elements described herein. Therefore, persons in the art will recognize from this description that other embodiments may be practiced with various modifications and alterations.

Cutting, breaking, or severing a chip in a data card may disable the chip and thus render the card inoperable. A properly disabled chip ensures that data on the chip may not be misused when the data card is thrown away. Applicant has recognized that an indicator may be used to facilitate the proper and accurate disabling of chips in data cards.

Figure 1:
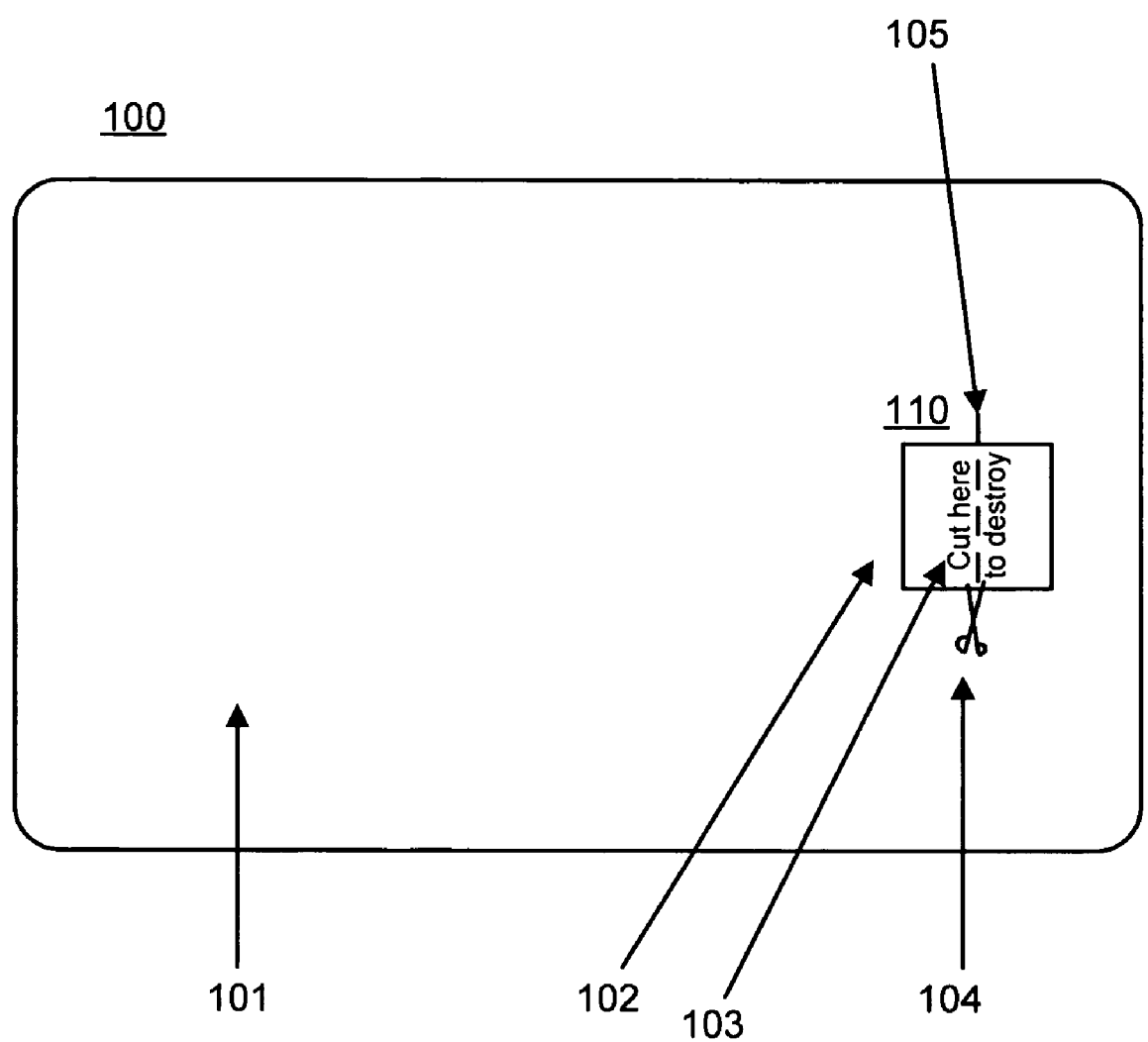
FIG. 1 is a diagram of a data card according to some embodiments.

Referring now to FIG. 1, an embodiment of a data card 100 is shown. The data card 100 may be, but is not limited to, a credit card, a smart card, or a contactless or radio frequency ("RFID") card such as a PayPass® card issued pursuant to MasterCard International rules. The data card 100 may include a chip (not shown), an antenna (not shown and only if the card is a contactless card), a face 101, and a cut indicator 110. The cut indicator 110 may comprise at least one of, a printed region 102, a textual instruction 103, a graphical cut indicator 104, and a cut indicator line 105.

The data card 100 may have a face 101 comprising, but not limited to, plastic, colored polypropylene, or clear polypropylene. The face 101 may include printed or embossed identification information. For example, the printed information may contain one or more of a cardholder's name, an account number, an expiration date, a "member since" date, a logo, or a trademark. In some embodiments, the face 101 may be blank. In some embodiments, the data card 100 may be an ID-1 card as defined by the International Organization for Standardization's standard 7810 having dimensions of about 85.6 millimeters at its longest point and about 53.98 millimeters at its widest point.

The printed region 102 may be any shape such as, but not limited to, a square or a circle. The printed region 102 may be placed in an area of the face 101 that is directly over, under, or adjacent to the chip. The printed region may contain a textual instruction 103. For example, the textual instruction 103 may provide directions for a cardholder to follow such as "cut here to destroy" or "punch here to destroy".

The cut indicator line 105 may intersect the printed region 102. Cutting, severing, or breaking the data card 100 along the cut indicator line 105 may cut, break, or sever the chip. The cut indicator line 105 may be a solid line or may be a dashed line. In some embodiments, the cut indicator line 105 may be a perforated line. Cutting, breaking, or severing the chip may provide improved security of cardholder information when a data card 100 is disposed of.

The graphical cut indicator 104 may be any graphical representation that provides direction to a cardholder to break, sever, or cut the chip such that the data card 100 is disabled. For example, a graphical representation of a scissors may be used to indicate where the cardholder should cut the data card 100 in order to cut, server, or break the chip. Having a graphical representation may help cardholders who cannot read the textual instruction 103 to know the location of where to cut the data card 100 in order to disable the chip.

Figure 2:
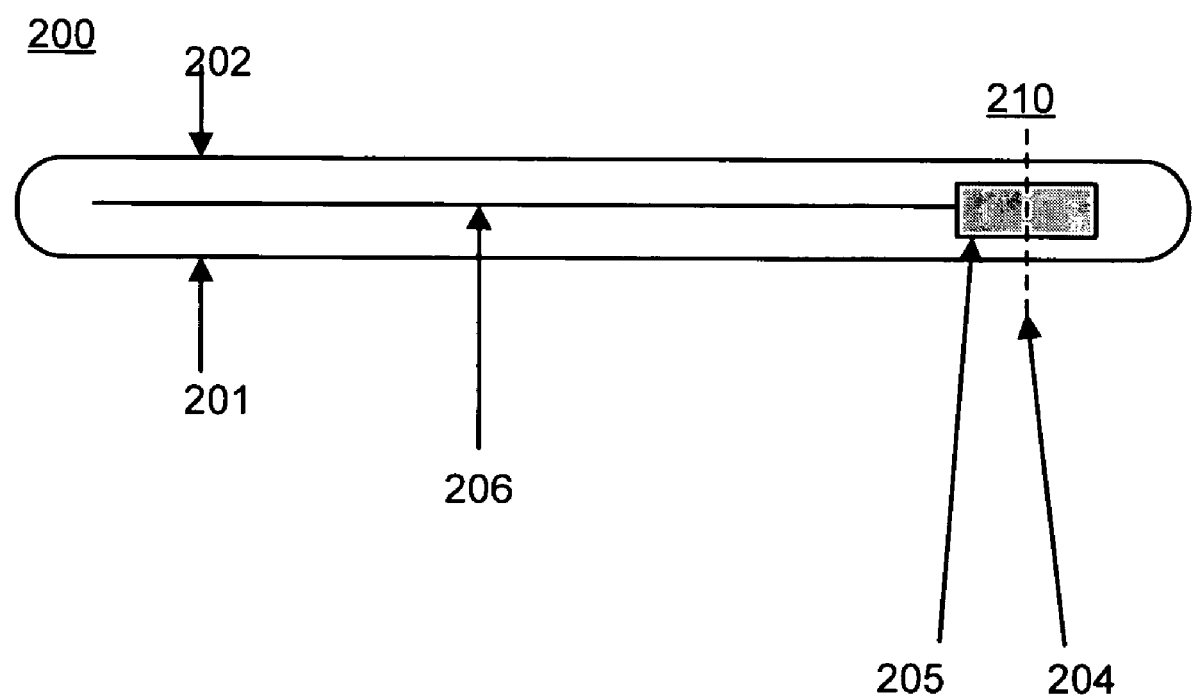
FIG. 2 is a diagram of a data card according to some embodiments.

Now referring to FIG. 2, an edge view of a data card 200 is shown according to some embodiments. The data card may comprise a first face 201, a second face 202, an antenna 206 and a chip 205. The first face 201 and the second face 202 may comprise a card body.

The chip 205 may be coupled to the antenna 206. The antenna 206 and the chip 205 may both be disposed or mounted between the first face 201 and the second face 202. Cutting, breaking, or tearing the chip 205 at a line 204 intersecting the location of the chip 205 may disable the chip 205. In some embodiments, the line 204 may represent a cut indicator. The chip 205 may be cut, broken, torn, or severed into two or more pieces such that it ceases to function and thus disables the data card 200. As illustrated in FIG. 2, the chip 205 may be oriented toward a side of the data card 200 however in some embodiments, the chip 205 may be placed in any area of the data card 200.

Figure 3:
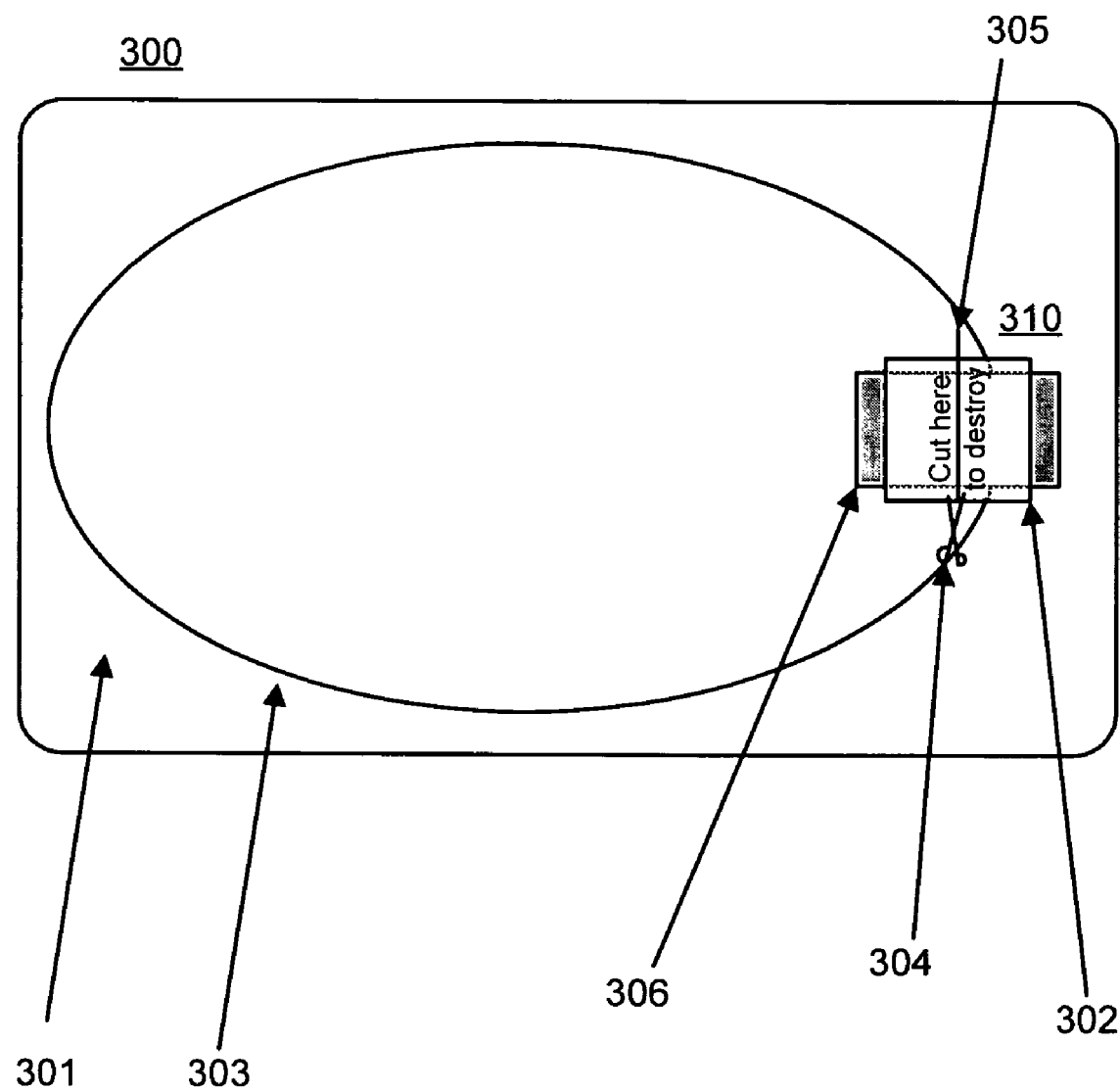
FIG. 3 is a diagram of a data card according to some embodiments.

FIG. 3 shows a data card 300 according to some embodiments. The data card 300 may include a chip 306, an antenna 303, a face 301, and a cut indicator 310. The cut indicator 310 may comprise at least one of a printed region 302, a textual instruction 303, a graphical cut indicator 304, or a cut indicator line 305.

In some embodiments, the data card 300 may have a face 301 and an opposing face (not shown). In some embodiments the face 301 and/or the opposing face may comprise a clear material such as, but not limited to, a clear polypropylene material. In some embodiments, the chip 306 and the antenna 303 may be disposed or mounted between the face 301 and the opposing face.

The antenna 303 may comprise any form of antenna, such as, but not limited to, a printed antenna, a coiled antenna, or a wound antenna. The chip 306 may comprise, but is not limited to, any chip, processor, gate, or integrated circuit that may be disposed between the face 301 and the opposing face.

Figure 4:
FIG. 4 is a block diagram of a method according to some embodiments.

Now referring to FIG. 4, an embodiment of a method is shown. At 401, a cutting device is lined up with a cut indicator. The cut indicator may be inscribed or embossed on a data card and may comprise at least one of, a printed region, a textual instruction, a graphical cut indicator, and a cut indicator line. In some embodiments, the cut indicator may have a contrasting color to a color of the data card. The cutting device may be, but is not limited to, a scissors, a knife, a paper cutter, a human hand, and a hole punch.

At 402, the data card is cut at the cut indicator. In some embodiments, the data card may be broken, severed, or punched with the cutting device at the cut indicator. The data card may comprise a chip that may be cut, broken, punched, or severed when the cutting device cuts, breaks, punches or severs through the data card at the cut indicator. For example, in some embodiments, a knife or scissors may be used to cut the data card such that the chip may be severed or cut into two or more pieces rendering the chip inoperable. In another embodiment, a hole punch may be positioned over the cut indicator and may punch through the chip breaking it into two or more pieces In still another embodiment, the cut indicator may be a perforated line that facilitates a cardholder tearing or snapping the data card such that the chip may be severed or broken into two or more pieces.

Figure 5:
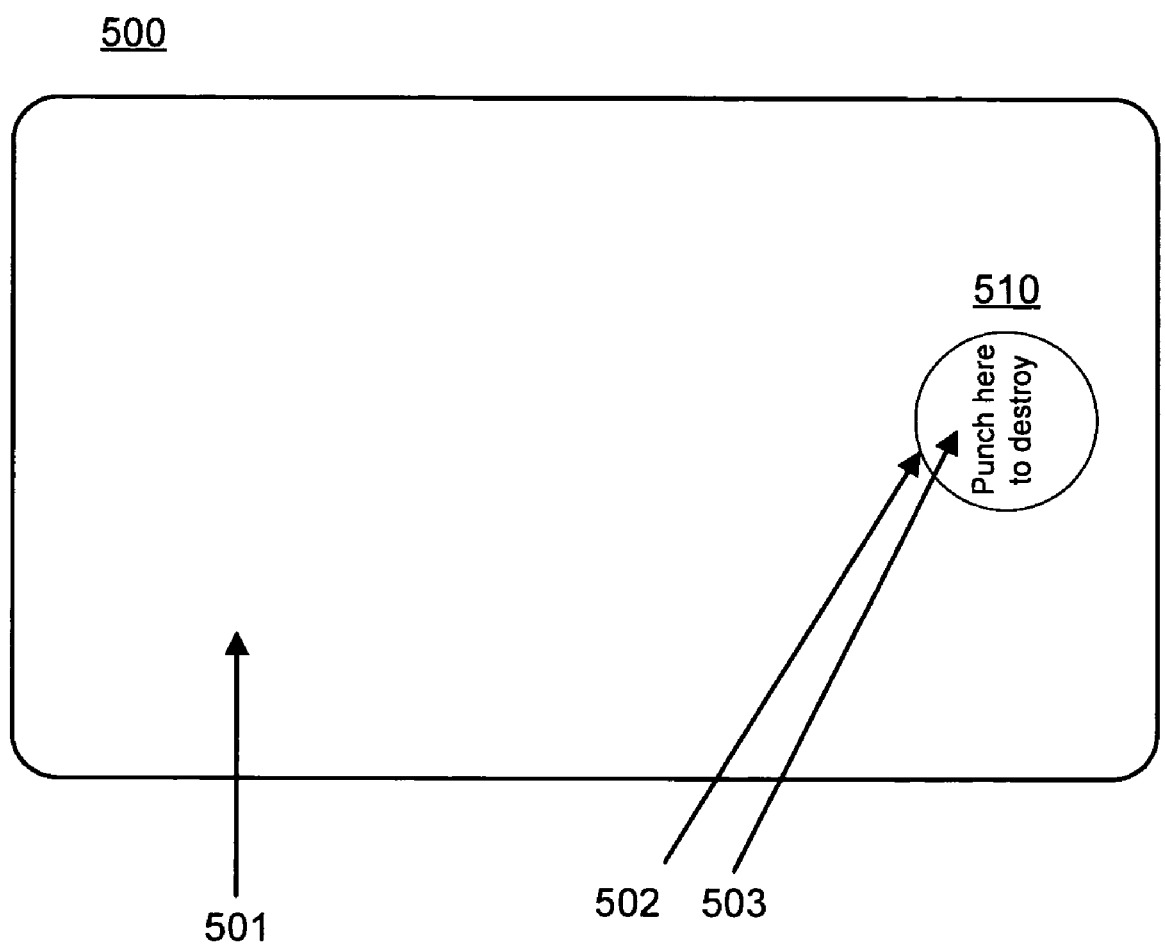
FIG. 5 is a diagram of a data card according to some embodiments.

At FIG. 5, an embodiment of a data card 500 is shown. The data card 500 comprises a face 501 and a cut indicator 510. The cut indicator 510 may comprise at least one of a printed region 502 and a textual instruction 503. As shown in FIG. 5, the textual instruction 503 may provide direction to a cardholder to punch a hole in the data card to destroy a chip (or otherwise render it inoperable). The printed region 502 may be located over, under, or adjacent to the chip and have a circle shape, or any other shape.

Figure 6:
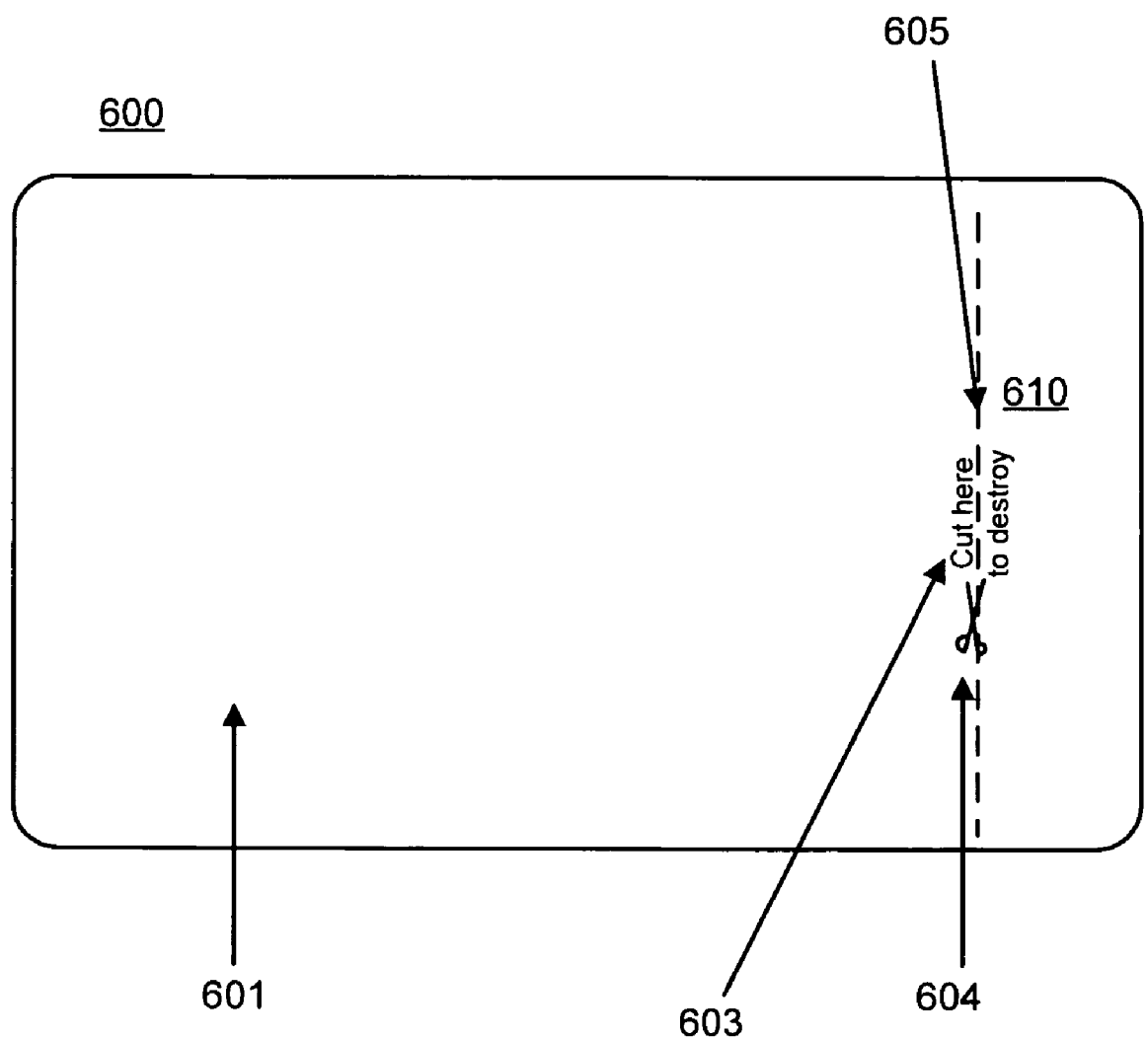
FIG. 6 is a diagram of a data card according to some embodiments.

Now referring to FIG. 6, an embodiment of a data card 600 is shown. The data card 600 may comprise a face 601 and a cut indicator 610. The cut indicator 610 may comprise at least one of a textual instruction 603, a graphical cut indicator 604, and a cut indicator line 605. The cut indicator line 605 may be a solid line or a dashed line and may extend a full width or length of the data card 600.

Figure 7:
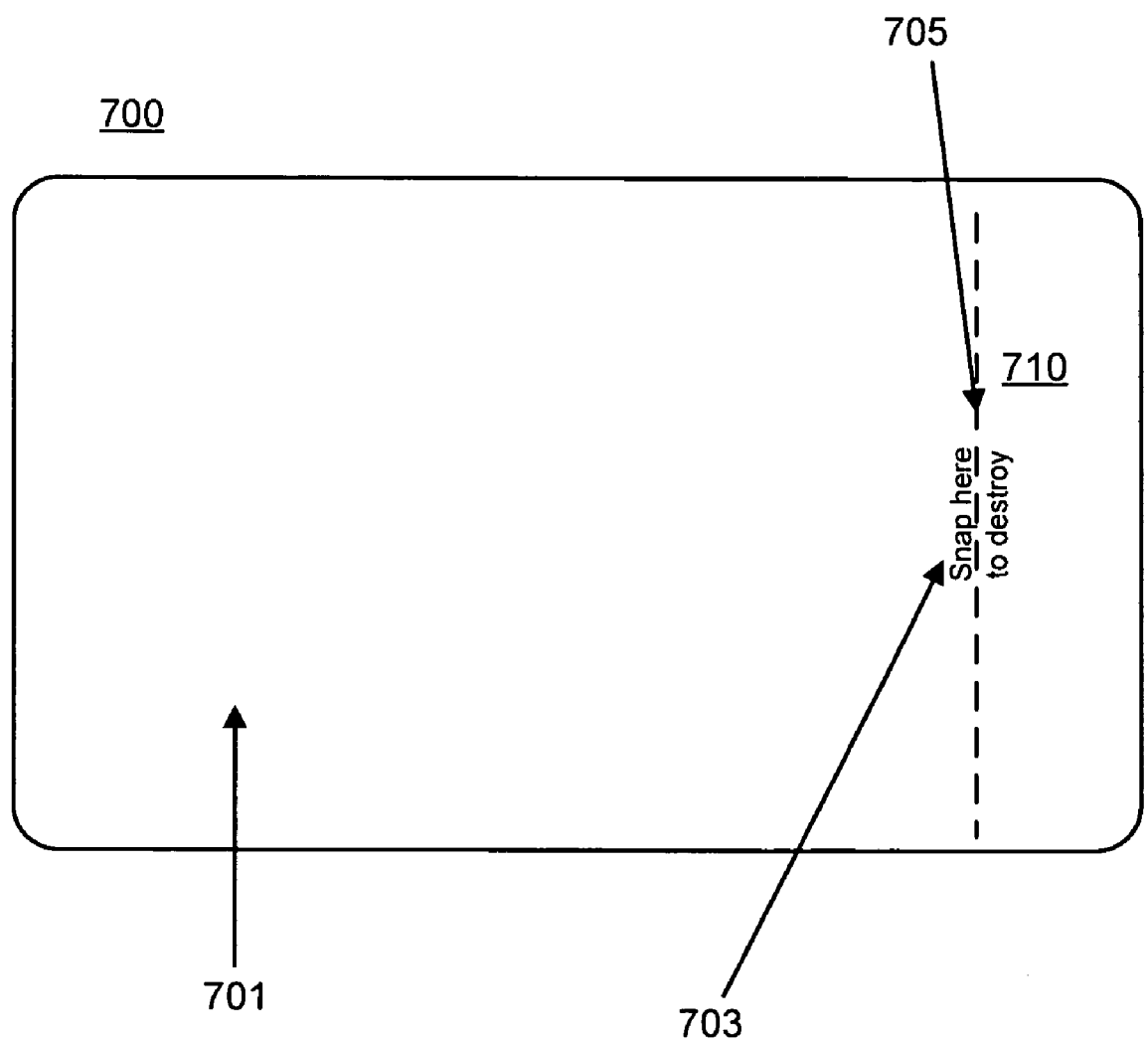
FIG. 7 is a diagram of a data card according to some embodiments.

Now referring to FIG. 7 an embodiment of a data card 700 is shown. The data card 700 may comprise a face 701 and a cut indicator 710. The cut indicator 710 may comprise at least one of a textual instruction 703 and a cut indicator line 705. The cut indicator line 705 may be line that extends a full width or length of the data card 700. The cut indicator line 705 may be a solid line or a dashed line. In some embodiments, the cut indicator 705 line may be perforated. A perforated cut indicator line 705 may allow a cardholder to snap or tear the data card 700 such that the tearing or snapping severs or breaks a chip such that the chip is disabled.

The several embodiments described herein are solely for the purpose of illustration. Embodiments may include any currently or hereafter-known elements that provide functionality similar to those described above. Therefore, persons skilled in the art will recognize from this description that other embodiments may be practiced with various modifications and alterations.

What is claimed is:

1. A data card issued to a cardholder, the data card comprising:
    a chip storing sensitive information associated with said cardholder; and
    a card body having a first outer face and a second outer face and the chip mounted in the card body between the first outer face and the second outer face, wherein at least one of the first outer face and the second outer face have a cut indicator providing said cardholder with visual instructions regarding where to and how to cut said card body and said chip to disable said chip and prevent access to said sensitive information.

2. The data card of claim 1, further comprising:
    an antenna.

3. The data card of claim 1, wherein the cut indicator comprises:
    a printed region located over a portion of the chip.

4. The data card of claim 3, wherein the cut indicator further comprises:
    a line running through a portion of the region.

5. The data card of claim 1, wherein the cut indicator comprises:
    a line located over a portion of the chip.

6. The data card of claim 5, wherein the line is perforated.

7. The data card of claim 3, wherein the printed region comprises at least one of a square and a circle.

8. The data card of claim 1, wherein cutting the data card at the cut indicator will disable the chip.

9. The data card of claim 1, wherein the cut indicator has a contrasting color to a color of the data card.

10. The data card of claim 1, wherein the data card is about 85.6 millimeters long at its longest point and about 53.98 millimeters wide at its widest point.

11. A method of disabling a data card, the data card issued to a cardholder and including at least a first chip storing sensitive information associated with said cardholder, the method comprising:
    aligning a cutting device with a cut indicator on an outer face of a data card providing visual instructions instructing the cardholder where to and how to cut the data card and at least one chip in said data card to disable the at least first chip; and
    cutting said data card and said chip at the cut indicator, thereby preventing further access to said sensitive information.

12. The method of claim 11, wherein the cutting severs the chip.

13. The method of claim 11, wherein the data card further comprises:
    an antenna.

14. The method of claim 13, wherein the cutting severs the antenna.

15. The method of claim 11, wherein the cut indicator comprises:
    a line located over a portion of the chip.

16. The method of claim 15, wherein the line is perforated.

17. The method of claim 11, wherein the cut indicator comprises:
    a printed square located over a portion of the chip.

18. The method of claim 17, wherein the cut indicator comprises:
    a line running through a portion of the square.

19. The method of claim 11, wherein the cut indicator is a contrasting color to a color of the data card.

20. The method of claim 11, wherein the data card is about 85.6 millimeters long at its longest point and about 53.98 millimeters wide at its widest point.

21. The method of claim 11, wherein the cutting device is at least one of a scissors and a knife.

* * * * *